(12) United States Patent
Lee (10) Patent No.: US 11,009,403 B2
(45) Date of Patent: May 18, 2021

(54) TIME DOMAIN TEMPERATURE SENSOR CIRCUIT WITH ENHANCED RESOLUTION

(71) Applicant: SAMSUNG ELECTRO-MECHANICS CO., LTD., Suwon-si (KR)

(72) Inventor: Soo Woong Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 398 days.

(21) Appl. No.: 16/170,595

(22) Filed: Oct. 25, 2018

(65) Prior Publication Data

US 2019/0277705 A1 Sep. 12, 2019

(30) Foreign Application Priority Data

Mar. 8, 2018 (KR) .................. 10-2018-0027683

(51) Int. Cl.
*G01K 7/00* (2006.01)
*G01K 7/20* (2006.01)
*H01C 10/50* (2006.01)

(52) U.S. Cl.
CPC ............... *G01K 7/20* (2013.01); *H01C 10/50* (2013.01)

(58) Field of Classification Search
USPC .................................. 374/170, 178
See application file for complete search history.

(56) References Cited

U.S. PATENT DOCUMENTS

| 2012/0007659 A1* | 1/2012 | Cusinato ................ G05F 3/242 327/513 |
| 2012/0119819 A1* | 5/2012 | Pyo ......................... G05F 3/242 327/513 |
| 2012/0218026 A1* | 8/2012 | Nadimpalli ............ G05F 3/242 327/513 |

(Continued)

FOREIGN PATENT DOCUMENTS

| JP | 5836074 B2 | 12/2015 |
| JP | 2016-46617 A | 4/2016 |
| KR | 10-2010-0020146 A | 2/2010 |

OTHER PUBLICATIONS

Korean Office Action dated Feb. 28, 2019 in corresponding Korean Patent Application No. 10-2018-0027683 (6 pages in English, 5 pages in Korean).

*Primary Examiner* — Lisa M Caputo
*Assistant Examiner* — Nasir U. Ahmed
(74) *Attorney, Agent, or Firm* — NSIP Law (57) ABSTRACT

A time domain temperature sensor circuit includes a voltage generating circuit configured to generate and equalize a first voltage of a first node and a second voltage of a second node, a current generating circuit comprising a first semiconductor device connected between the first node and a ground, and configured to generate a first current, and a variable resistor circuit and a second semiconductor device connected in series between the second node and the ground, and configured to generate a second current, the variable resistor circuit being configured to vary a temperature gradient of the second current based on resistance variations by the variable resistor circuit, and a current mirror circuit configured to generate a third current by performing current mirroring of the second current and transmit the third current to an output terminal.

17 Claims, 6 Drawing Sheets

(56) References Cited

U.S. PATENT DOCUMENTS

| | | | |
|---|---|---|---|
| 2013/0121377 A1* | 5/2013 | Furuichi | G01K 7/01 |
| | | | 374/178 |
| 2013/0259091 A1* | 10/2013 | Chen | G01K 7/34 |
| | | | 374/184 |
| 2016/0054183 A1 | 2/2016 | Yayama | |
| 2016/0246317 A1* | 8/2016 | Song | G05F 1/575 |
| 2016/0320790 A1* | 11/2016 | Wu | G05F 3/267 |

* cited by examiner

TIME DOMAIN TEMPERATURE SENSOR CIRCUIT WITH ENHANCED RESOLUTION

CROSS-REFERENCE TO RELATED APPLICATION

This application claims the benefit under 35 U.S.C. § 119(a) of Korean Patent Application No. 10-2018-0027683 filed on Mar. 8, 2018 in the Korean Intellectual Property Office, the entire disclosure of which is incorporated herein by reference for all purposes.

BACKGROUND

1. Field

This application relates to a time domain temperature sensor circuit having enhanced resolution.

2. Description of Related Art

In general, a typical temperature sensor circuit that is embedded in a typical integrated circuit (IC) may be used to detect an internal temperature of the IC and compensate for performance degradation of the IC. Typically, a voltage domain temperature sensor that implements a typical band gap reference (BGR) circuit and an analog/digital converter (ADC) circuit has been widely used. However, recently, a time domain temperature sensor, designed to be simple and having a small size, and without an ADC circuit has also been widely used. An important performance factor in such a temperature sensor is resolution and an error rate.

Resolution of a temperature sensor may be determined according to the relation (variation amount of output signal depending on temperature)/(variation amount of temperature) and, in this regard, the temperature sensor is designed with an optimum value obtained in consideration of linearity and resolution. However, when a typical temperature sensor embodied in an IC measures temperature, a variation amount or linearity of an output signal may typically become different from a design value and, thus, a desired level of performance may not be achieved.

A typical time domain temperature sensor circuit includes two first and second current controlled oscillators (CCOs). In this regard, a CCO generates different oscillation frequencies depending on received bias current and, thus, the first CCO generates current that is linearly changed, depending on temperature and, thus, outputs an oscillation frequency signal that is linearly changed depending on temperature and, the second CCO generates current that is independent from temperature and, thus, outputs a constant oscillation frequency signal that is not changed depending on temperature.

In such a typical temperature sensor circuit, at low temperature and high temperature, a first clock (linear) is largely changed depending on temperature but a second clock (constant) is slightly changed or negligibly changed depending on temperature and, thus, a counting value of a clock is largely changed depending on a temperature change. A temperature of the temperature sensor may be determined based on a difference between counting values.

However, a typical temperature sensor circuit may not be able to control linearity, resolution, or a signal level and, thus, there may be a problem in that post-design tuning may not be possible, leading to degraded resolution and a degraded error rate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a time domain temperature sensor circuit includes a voltage generating circuit configured to generate and equalize a first voltage of a first node and a second voltage of a second node, a current generating circuit comprising a first semiconductor device connected between the first node and a ground, and configured to generate a first current, and a variable resistor circuit and a second semiconductor device connected in series with the variable resistor circuit between the second node and the ground, the second semiconductor device being configured to generate a second current, and the variable resistor circuit being configured to vary a temperature gradient of the second current based on resistance variations by the variable resistor circuit, and a current mirror circuit configured to generate a third current by performing current mirroring of the second current and transmit the third current to an output terminal.

The variable resistor circuit may include first to $n^{th}$ resistors which each have different temperature gradients and are connected to each other in parallel, and first to $n^{th}$ switches respectively connected in series with each of the first to $n^{th}$ resistors, and configured to select a corresponding resistor.

The variable resistor circuit may include first to $n^{th}$ resistors which each have different temperature gradients and are connected to each other in series; and first to $n^{th}$ switches respectively connected in parallel with each of the first to $n^{th}$ resistors, and configured to select a corresponding resistor.

The voltage generating circuit may include a first field-effect transistor (FET) including a source connected to a voltage power terminal and a drain connected to the first node, a second FET including a source connected to the voltage power terminal, a drain connected to the second node, and a gate connected to a gate of the first FET, and an operational amplifier configured to control a gate voltage of the first FET and the second FET based on a voltage difference between the first voltage and the second voltage.

The first semiconductor device may be a first bipolar junction transistor (BJT) which includes an emitter connected to the first node, a base connected to a ground, and a collector connected to the ground.

The second semiconductor device may be a second BJT including an emitter connected to the variable resistor circuit, a base connected to a ground, and a collector connected to the ground.

The current mirror circuit may include a third FET including a source connected to the voltage power terminal, a drain connected to the output terminal, and a gate connected to a gate of the second FET.

In a general aspect, a time domain temperature sensor circuit includes a voltage generating circuit configured to generate and equalize a first voltage of a first node and a second voltage of a second node, a current generating circuit comprising a first semiconductor device connected between the first node and a ground, and configured to generate a first current, and a variable resistor circuit and a second semiconductor device connected in series between the second node and the ground, and configured to generate a second current with a linear temperature gradient, a current mirror circuit configured to generate a third current by performing current mirroring of the second current, and a current adjusting circuit configured to adjust an output current and supply the output current to an output terminal based on the third current to compensate for variations in the second current during variations of the temperature gradient.

The variable resistor circuit may include first to $n^{th}$ resistors which each have different temperature gradients and are connected to each other in parallel, and first to $n^{th}$ switches respectively connected in series with each of the first to $n^{th}$ resistors, and configured to select a corresponding resistor.

The variable resistor circuit may include first to $n^{th}$ resistors which each have different temperature gradients and are connected to each other in series, and first to $n^{th}$ switches respectively connected in parallel with each of the first to $n^{th}$ resistors and configured to select a corresponding resistor.

The voltage generating circuit may include a first field-effect transistor (FET) including a source connected to a voltage power terminal and a drain connected to the first node, a second FET including a source connected to the voltage power terminal, a drain connected to the second node, and a gate connected to a gate of the first FET, and an operational amplifier configured to control a gate voltage of the first FET and the second FET, based on a voltage difference between the first voltage and the second voltage.

The first semiconductor device may be a first bipolar junction transistor (BJT) which includes an emitter connected to the first node, a base connected to a ground, and a collector connected to the ground.

The second semiconductor device may be a second BJT including an emitter connected to the variable resistor circuit, a base connected to a ground, and a collector connected to the ground.

The current mirror circuit comprises a third FET including a source connected to the voltage power terminal, a drain connected to the output terminal, and a gate connected to a gate of the second FET.

The current adjusting circuit may include a fourth FET including a drain and a gate connected to an output node of the current mirror circuit, and a grounded source, first to $n^{th}$ mirror FETs configured to independently perform current mirroring of current of the fourth FET, and first to $n^{th}$ current mirror switches configured to respectively select the first to $n^{th}$ mirror FETs, and sum and supply selected currents through an output terminal.

In a general aspect, a method comprises generating a first current with a first current generating device, generating a second current with a second current generating device, and generating a third current by mirroring the second current generated by the second current generating device, adjusting a level of an output current based on a temperature gradient of the second current, and transmitting the output current to an output terminal.

The temperature gradient may be varied by varying a resistance of a variable resistor.

The output current may be adjusted to compensate for variations in the second current based on variations of the temperature gradient of the second current.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
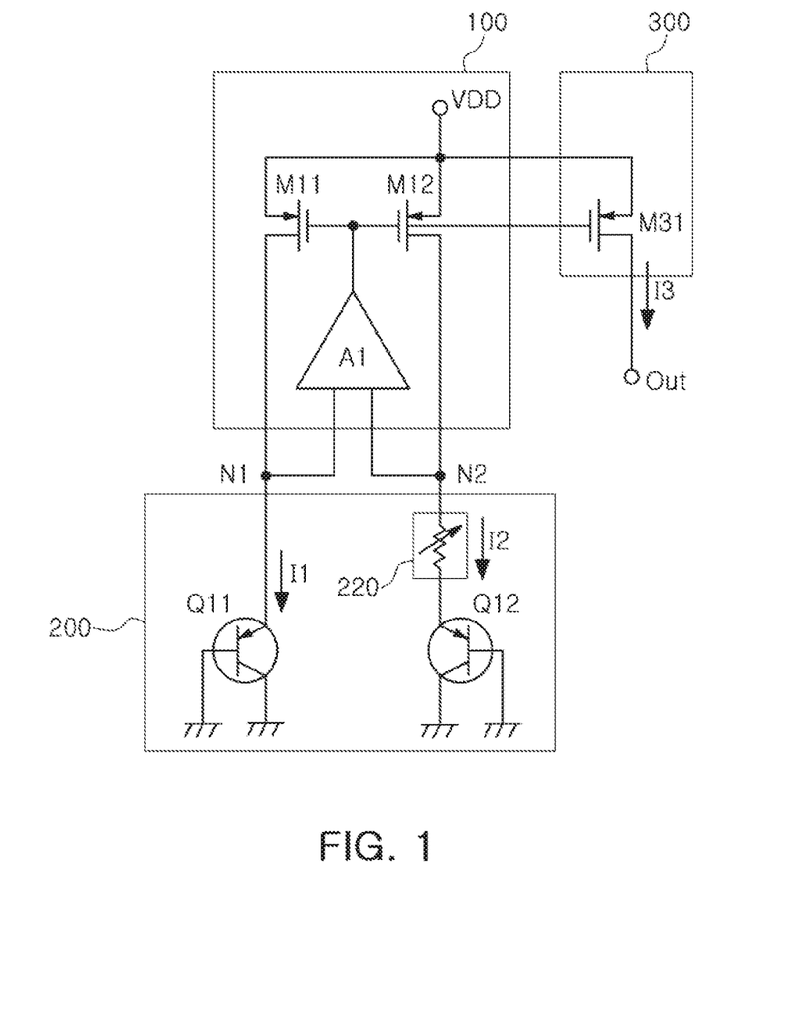
FIG. 1 is a diagram illustrating an example of a configuration of a time domain temperature sensor circuit.

FIG. 1 is a diagram illustrating a first example of a configuration of a time domain temperature sensor circuit according to an embodiment of the present disclosure.

Referring to FIG. 1, the time domain temperature sensor circuit according to an example may include a voltage generating circuit 100, a current generating circuit 200, and a current mirror circuit 300.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The voltage generating circuit 100 may generate and equalize a first voltage V1 of a first node N1 and a second voltage V2 of a second node N2.

The current generating circuit 200 may include a first semiconductor device Q11 connected between the first node N1 and ground to generate a first current I1, and a variable resistor circuit 220 and a second semiconductor device Q12 that are connected to each other in series between the second node N2 and ground to generate a second current I2 and, in this example, the variable resistor circuit 220 may vary a temperature gradient by varying the resistance. The temperature gradient refers to a gradient of current variation to temperature variation.

The current mirror circuit 300 may generate a third current I3 through current mirroring of the second current I2 and may supply the third current I3 to an output terminal OUT.

With regard to the drawings of this application, a repeated description of components with the same reference numeral and the same function is omitted if possible and a difference in the drawings is described below.

Figure 2:
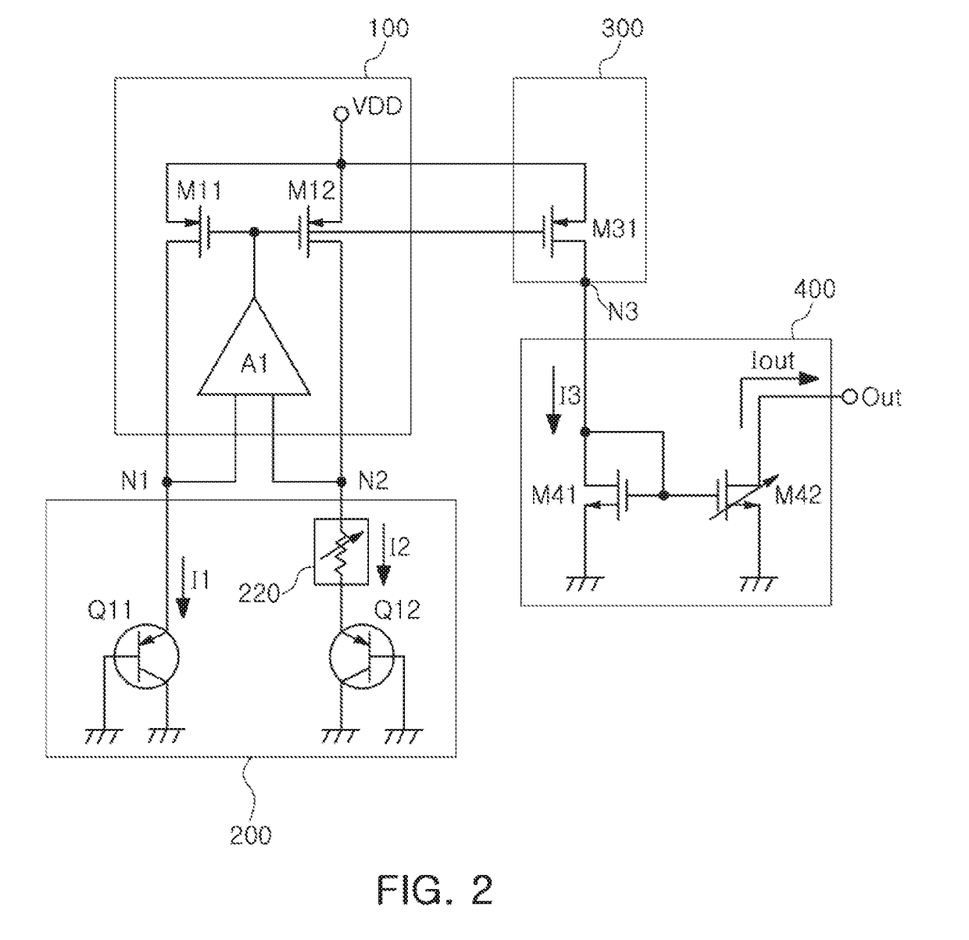
FIG. 2 is a diagram illustrating an example of a configuration of a time domain temperature sensor circuit.

FIG. 2 is a diagram illustrating an example of a configuration of a time domain temperature sensor circuit.

Referring to FIG. 2, in an example, the time domain temperature sensor circuit may include the voltage generating circuit 100, the current generating circuit 200, the current mirror circuit 300, and a current adjusting circuit 400.

The voltage generating circuit 100 may generate and equalize the first voltage V1 of the first node N1 and the second voltage V2 of the second node N2.

The current generating circuit 200 may include the first semiconductor device Q11 connected between the first node N1 and ground to generate the first current I1, and the variable resistor circuit 220 and the second semiconductor device Q12 that are connected to each other in series between the second node N2 and ground to generate the second current I2 with a linear temperature gradient.

The current mirror circuit 300 may generate the third current I3 through current mirroring of the second current I2.

The current adjusting circuit 400 may adjust an output current Iout based on the third current I3 and may supply the output current Iout to the output terminal OUT to compensate for variations in the second current I2 during variations of the temperature gradient.

For example, the second current I2 with the linear temperature gradient, which is generated by the current generating circuit 200, may be unintentionally varied (increased or reduced) during a generation procedure and, as such, varied current may be compensated for by as much as the amplitude of current amplitude varied by the current adjusting circuit 400.

Referring to FIGS. 1 and 2, for example, the voltage generating circuit 100 may include a first field-effect transistor (FET) M11, a second FET M12, and an operational amplifier A1.

The first FET M11 may be a PMOS FET including a source connected to a voltage power VDD terminal and a drain connected to the first node N1, and a gate connected to a gate of the second FET M12. The FET M11 is not limited to a PMOS FET.

The second FET M12 may be a PMOS FET including a source connected to the voltage power VDD terminal, a drain connected to the second node N2, and a gate connected to a gate of the first FET M11. The FET 12 is not limited to a PMOS FET.

The operational amplifier A1 may control a gate voltage of the first FET M11 and the second FET M12 based on a voltage difference between the first voltage V1 and the second voltage V2 and, according to an operation of the operational amplifier A1, the first voltage of the first node N1 and the second voltage of the second node N2 may be equalized.

For example, the first semiconductor device Q11 of the current generating circuit 200 may be a P-type first bipolar junction transistor (BJT). The first semiconductor device Q11 may include an emitter connected to the first node N1, a base connected to a ground, and a collector connected to a ground.

The second semiconductor device Q12 of the current generating circuit 200 may be a P-type second BJT. The second semiconductor device Q12 may include an emitter connected to the variable resistor circuit 220, a base connected to a ground, and a collector connected to a ground.

In an example, the current mirror circuit 300 may include a third FET M31. The third FET M31 may be a PMOS FET including a source connected to the voltage power VDD terminal, a drain connected to the output terminal OUT, and a gate connected to the gate of the second FET M12.

In an example, referring to FIGS. 1 and 2, the first voltage V1 of the first node N1 and the second voltage V2 of the second node N2 may be equalized by the first FET M11, the second FET M12, and the operational amplifier A1.

The first current I1 that flows between the first node N1 and the ground may be determined depending on the first voltage of the first node N1 and the resistance of the first semiconductor device Q11. Similarly, the second current I2 that flows between the second node N2 and ground may be determined depending on the second voltage of the second node N2 and the resistance of the second semiconductor device Q12 and the variable resistor circuit 220. For example, when the resistance is varied by the variable resistor circuit 220, the second current I2 may be varied.

The current mirror circuit 300 may generate the third current I3 through current mirroring of the second current I2 and, in an example, the third current I3 may be determined depending on a size ratio of the second FET M12 and the third FET M31.

For example, the third current I3 output by the current mirror circuit 300 may be determined according to Expression 1 below.

$$VEB1 = VEB2 + I2*R220$$

$$VEB1 - VEB2 = VT*\text{Ln}(16)$$

$$I2 = (VT*\text{Ln}*(16))/R220, VT=25 \text{ mV}, R220=100\text{K}\Omega$$

$$I2 \cong 690 \text{ nA} \quad \quad \text{Expression 1:}$$

In Expression 1 above, VEB1 is an emitter-based voltage of the first semiconductor device Q11, VEB2 is an emitter-based voltage of the second semiconductor device Q12, R220 is a resistance value of the variable resistor circuit 220, VT is a thermal voltage of a BJT, and Ln(16) indicates that 16 is a ratio of the first semiconductor device Q11 and the second semiconductor device Q12. This is merely an example and the present disclosure is not limited thereto.

Expression 1 above shows an example in which the second current I2 is derived when the resistance value R220 of the variable resistor circuit 220 at room temperature is 100 KΩ and n=16.

According to Expression 1 above, the second current I2 may be changed in relation to temperature based on temperature characteristic of the resistance value R220 of the variable resistor circuit 220. That is, the second current is changed depending on temperature, which means that a frequency is changed depending on temperature with reference to Expression 2 below and, thus, it may be possible to obtain a frequency that is changed linearly depending on temperature and, accordingly, it may be seen that a gradient of resistance of the variable resistor circuit 220 to temperature is important.

$$F = I/CV \quad \quad \text{Expression 2:}$$

Figure 3:
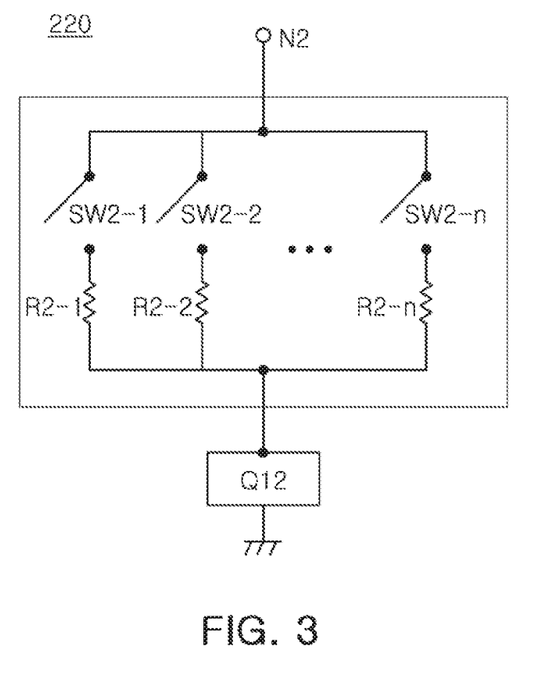
FIG. 3 is a diagram illustrating an example of a variable resistor circuit.
Figure 4:
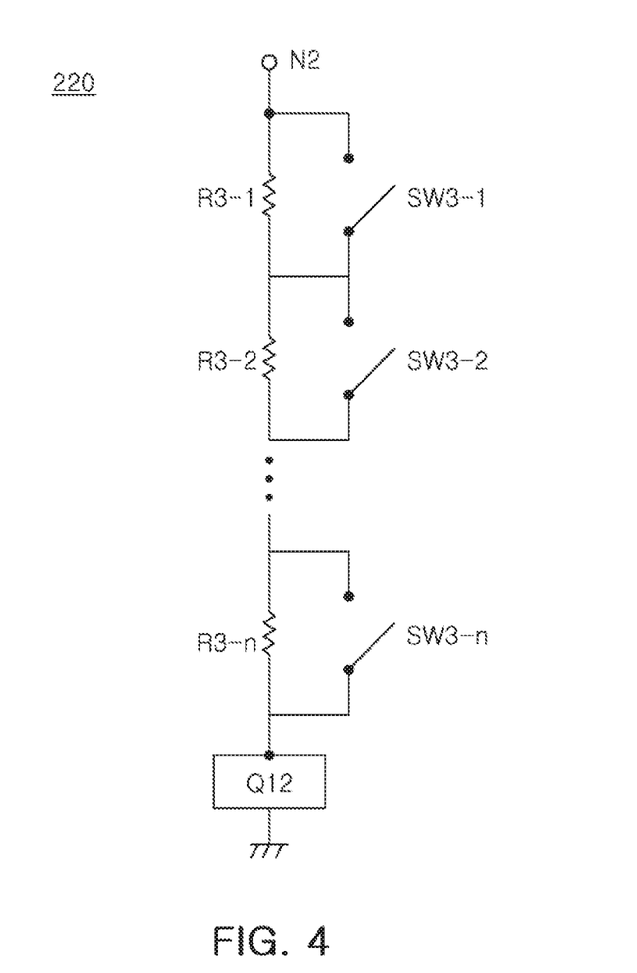
FIG. 4 is a diagram illustrating an example of a variable resistor circuit.

In an example, the variable resistor circuit 220 may be embodied as shown in FIGS. 3 and 4 to generate the second current I2 with a linear temperature gradient.

In an example, the variable resistor circuit 220 may include a plurality of parallel-connected resistors, and the plurality of resistors may have different temperature coefficients, respectively. For example, in general, a semiconductor process may provide resistors with various temperature coefficients, i.e., a resistor with resistance varied by +10% depending on temperature may be present and, on the other hand, a resistor with resistance varied by −20% depending on temperature may be present. When resistors with different types of temperature gradients are combined and used, a resistance value with various gradients depending on temperature may be provided.

FIG. 3 is a diagram illustrating an example of a variable resistor circuit.

Referring to FIG. 3, the variable resistor circuit 220 may include first to $n^{th}$ resistors R2-1 to R2-n and first to $n^{th}$ switches SW2-1 to SW2-n.

The first to $n^{th}$ resistors R2-1 to R2-n may have different temperature gradients and may be connected to each other in parallel.

The first to $n^{th}$ switches SW2-1 to SW2-n may be connected to the first to $n^{th}$ resistors R2-1 to R2-n in series, respectively, to select a corresponding resistor.

FIG. 4 is a diagram illustrating an example of a variable resistor circuit.

Referring to FIG. 4, the variable resistor circuit 220 may include first to $n^{th}$ resistors R3-1 to R3-n and first to $n^{th}$ switches SW3-1 to SW3-n.

The first to $n^{th}$ resistors R3-1 to R3-n may have different temperature gradients and may be connected to each other in series.

The first to $n^{th}$ switches SW3-1 to SW3-n may be respectively connected to the first to $n^{th}$ resistors R3-1 to R3-n in parallel, to select a corresponding resistor.

For example, referring to FIGS. 3 and 4, the first to $n^{th}$ resistors R2-1 to R2-n and R3-1 to R3-n may have the same resistance of 100 KΩ at room temperature and may each be designed to have different gradients of resistance depending on temperature. For example, the first resistor R2-1 may have a temperature gradient of +10% with respect to all temperature ranges, the second resistor R2-2 may have a temperature gradient of +20%, and the $n^{th}$ resistor may have a temperature gradient of −10%. As such, proportional to absolute temperature (PTAT) current with various temperature gradients may be generated according to a method of connecting resistors with different temperature gradients.

Figure 5:
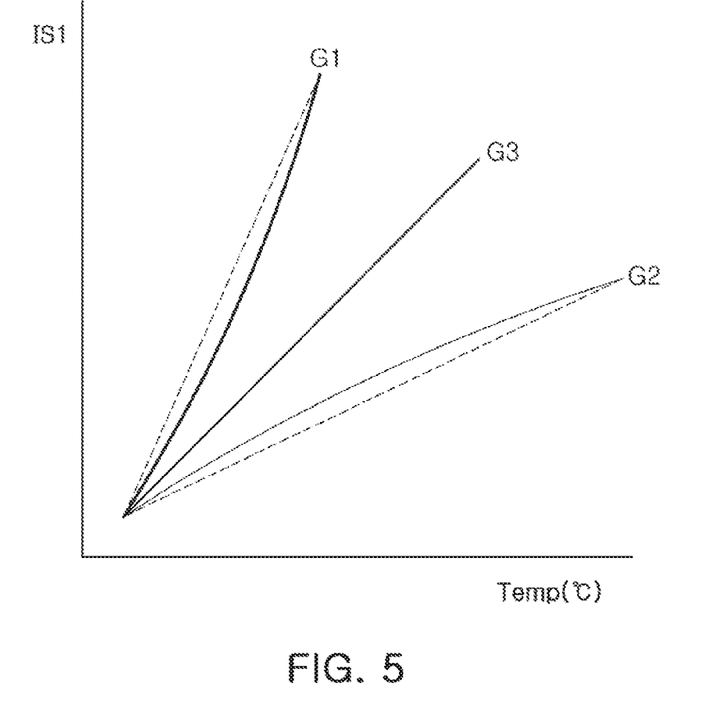
FIG. 5 is a diagram illustrating the linearity of current with respect to temperature of a time domain temperature sensor circuit.

FIG. 5 is a diagram illustrating the linearity of current with respect to temperature of a time domain temperature sensor circuit.

FIG. 5 is a diagram illustrating the tuning or correcting of a temperature gradient of current. As shown in FIG. 5, resistance characteristics may not be linear depending on temperature, which is a feature of a semiconductor process for manufacturing a resistor.

In FIG. 5, G1 is a plot in which a temperature gradient of current is increased with increase in temperature, G2 is a plot in which a temperature gradient of current is reduced with increase in temperature, and G3 is a plot that is very linear depending on temperature.

Referring to G1, G2, and G3 shown in FIG. 5, this is because a temperature gradient of current is non-linear depending on temperature and, thus, when a current gradient is generally increased with increase in temperature, a variation rate of a frequency is increased, thereby enhancing resolution but, even if a current gradient is high, when linearity is poor, an entire error rate of a temperature sensor is increased.

Figure 6:
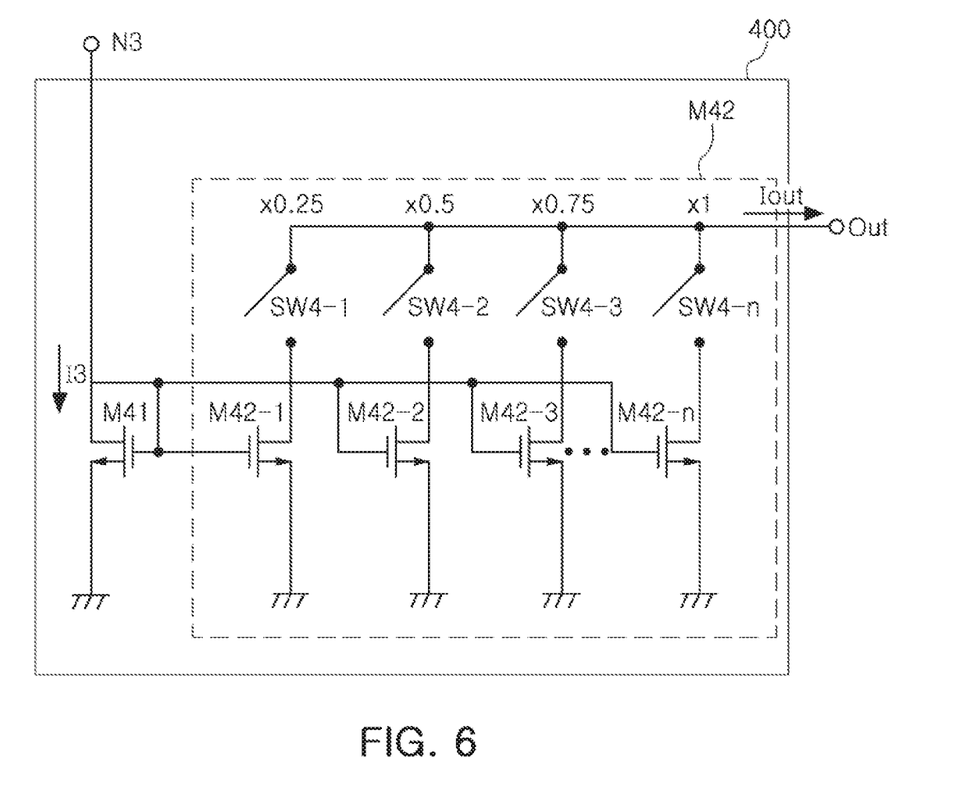
FIG. 6 is a diagram illustrating an example of a current adjusting circuit.

FIG. 6 is a diagram illustrating an example of a current adjusting circuit.

Referring to FIG. 6, the current adjusting circuit 400 may include a fourth FET M41 and a fifth FET M42. The fifth FET M42 may include first to $n^{th}$ current mirror FETs M42-1 to M42-n and first to $n^{th}$ current mirror switches SW4-1 to SW4-n.

The fourth FET M41 may be a PMOS FET that includes a drain and a gate connected to an output node N3 of the current mirror circuit 300, and a grounded source.

Each of the first to $n^{th}$ current mirror FETs M42-1 to M42-$n$ may independently perform current mirroring of current of the fourth FET M41. Each of the first to $n^{th}$ current mirror switches SW4-1 to SW4-$n$ may select each of the first to $n^{th}$ current mirror FETs M42-1 to M42-$n$. That is, current generated by each of the first to $n^{th}$ current mirror FETs M42-1 to M42-$n$ may be selected and combined by the first to $n^{th}$ current mirror switches SW4-1 to SW4-$n$, and may be output through the output terminal OUT.

When the current adjusting circuit 400 is implemented, the amplitude of mirrored PTAT current may be adjusted to change a current level in a state in which a current gradient is maintained and, thus, the current adjusting circuit 400 may compensate for current variation during resistance variation for linearity of a temperature gradient through the current generating circuit 200.

Referring to FIGS. 3, 5, and 6, for example, assuming that the first and second resistors R2-1 to R2-2 of FIG. 3 are simultaneously selected and a current of proportional to absolute temperature (PTAT) with about +15% is generated, the first and second resistors R2-1 to R2-2 of 100 KΩ are connected to each other in parallel, total resistance summed in parallel may be about 50 KΩ and, as such, total resistance is reduced and, thus, PTAT current may be approximately doubled.

Accordingly, an oscillation frequency may be doubled according to Expression 2 above and, when a range of the oscillation frequency is outside a predetermined level or greater, performance may be degraded and, thus, it may be desired to generate an oscillation frequency in a predetermined range and, to this end, the current adjusting circuit 400 of FIG. 6 may be desired.

For example, when two resistors are simultaneously selected in FIG. 3, the second current mirror switch SW4-2 may be selected and current may be supplied to an oscillator to reduce amplitude of increased current N×IPTAT in half to match a last oscillation frequency with an estimated value.

For example, current doubled by the current generating circuit 200 and the current mirror circuit 300 should be re-reduced in half by the current adjusting circuit 400.

When four resistors in FIG. 3 are selected, PTAT current is increased four times, and the first current mirror switch SW4-1 in FIG. 6 may be selected to re-reduce the current by ¼, thereby maintaining a range of an oscillation frequency.

In FIG. 6, current variation may be performed up to 0.25 to 2.5 times but the range may be sufficiently extended through current mirroring and switch addition.

As set forth above, according to the various examples, a current gradient and current level depending on temperature may be adjusted to control a frequency of an oscillator and, thus, linearity and resolution may be tuned and, accordingly, an error rate may be optimally improved through tuning after a manufacturing process.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A time domain temperature sensor circuit comprising:
    a voltage generating circuit configured to generate and equalize a first voltage of a first node, and a second voltage of a second node;
    a current generating circuit comprising:
        a first semiconductor device, connected between the first node and a ground, and configured to generate a first current,
        a variable resistor circuit; and
        a second semiconductor device, connected in series with the variable resistor circuit between the second node and the ground, the second semiconductor device being configured to generate a second current,
        wherein the variable resistor circuit is configured to vary a temperature gradient of the second current based on resistance variations by the variable resistor circuit, and comprises two or more resistors which have different temperature gradients; and
    a current mirror circuit configured to generate a third current that is proportional to a measured temperature by performing current mirroring of the second current, and transmit the generated third current to an output terminal.

2. The time domain temperature sensor circuit of claim 1, wherein the variable resistor circuit further comprises:
    first to $n^{th}$ switches respectively connected in series with each of the first to $n^{th}$ resistors, and configured to select a corresponding resistor, and
    wherein the first to $n^{th}$ resistors are connected to each other in parallel.

3. The time domain temperature sensor circuit of claim 1, wherein the variable resistor circuit comprises:
    first to $n^{th}$ resistors two or more of which each have different temperature gradients and are connected to each other in series; and
    first to $n^{th}$ switches respectively connected in parallel with each of the first to $n^{th}$ resistors, and configured to select a corresponding resistor.

4. The time domain temperature sensor circuit of claim 1, wherein the voltage generating circuit comprises:
    a first field-effect transistor (FET) including a source connected to a voltage power terminal and a drain connected to the first node;
    a second FET including a source connected to the voltage power terminal, a drain connected to the second node, and a gate connected to a gate of the first FET; and
    an operational amplifier configured to control a gate voltage of the first FET and the second FET based on a voltage difference between the first voltage and the second voltage.

5. The time domain temperature sensor circuit of claim 4, wherein the current mirror circuit comprises a third FET including a source connected to the voltage power terminal, a drain connected to the output terminal, and a gate connected to a gate of the second FET.

6. The time domain temperature sensor circuit of claim 1, wherein the first semiconductor device is a first bipolar junction transistor (BJT) which includes an emitter connected to the first node, a base connected to a ground, and a collector connected to the ground.

7. The time domain temperature sensor circuit of claim 1, wherein the second semiconductor device is a second BJT including an emitter connected to the variable resistor circuit, a base connected to a ground, and a collector connected to the ground.

8. A time domain temperature sensor circuit comprising:
a voltage generating circuit configured to generate and equalize a first voltage of a first node and a second voltage of a second node;
a current generating circuit comprising a first semiconductor device connected between the first node and a ground, and configured to generate a first current, and a variable resistor circuit and a second semiconductor device connected in series between the second node and the ground, and configured to generate a second current with a linear temperature gradient;
a current mirror circuit configured to generate a third current that is proportional to a measured temperature by performing current mirroring of the second current; and
a current adjusting circuit configured to adjust an output current and supply the output current to an output terminal based on the third current to compensate for variations in the second current during variations of the temperature gradient,
wherein the variable resistor circuit comprises two or more resistors which have different temperature gradients.

9. The time domain temperature sensor circuit of claim 8, wherein the variable resistor circuit further comprises:
first to $n^{th}$ switches respectively connected in series with each of the first to $n^{th}$ resistors, and configured to select a corresponding resistor, and
wherein the first to $n^{th}$ resistors are connected to each other in parallel.

10. The time domain temperature sensor circuit of claim 8, wherein the variable resistor circuit comprises:
first to $n^{th}$ resistors which each have different temperature gradients and are connected to each other in series; and
first to $n^{th}$ switches respectively connected in parallel with each of the first to $n^{th}$ resistors and configured to select a corresponding resistor.

11. The time domain temperature sensor circuit of claim 8, wherein the voltage generating circuit comprises:
a first field-effect transistor (FET) including a source connected to a voltage power terminal and a drain connected to the first node;
a second FET including a source connected to the voltage power terminal, a drain connected to the second node, and a gate connected to a gate of the first FET; and
an operational amplifier configured to control a gate voltage of the first FET and the second FET, based on a voltage difference between the first voltage and the second voltage.

12. The time domain temperature sensor circuit of claim 11, wherein the current mirror circuit comprises a third FET including a source connected to the voltage power terminal, a drain connected to the output terminal, and a gate connected to a gate of the second FET.

13. The time domain temperature sensor circuit of claim 8, wherein the first semiconductor device is a first bipolar junction transistor (BJT) which includes an emitter connected to the first node, a base connected to a ground, and a collector connected to the ground.

14. The time domain temperature sensor circuit of claim 8, wherein the second semiconductor device is a second BJT including an emitter connected to the variable resistor circuit, a base connected to a ground, and a collector connected to the ground.

15. The time domain temperature sensor circuit of claim 8, wherein the current adjusting circuit comprises:
a fourth FET including a drain and a gate connected to an output node of the current mirror circuit, and and a grounded source;
first to $n^{th}$ mirror FETs configured to independently perform current mirroring of current of the fourth FET;
first to $n^{th}$ current mirror switches configured to respectively select the first to $n^{th}$ mirror FETs, and sum and supply selected currents through an output terminal.

16. A method comprising:
generating a first current with a first current generating device;
generating a second current with a second current generating device;
generating a third current that is proportional to a measured temperature by mirroring the second current generated by the second current generating device,
adjusting a level of an output current based on a temperature gradient of the second current, and
transmitting the output current to an output terminal,
wherein the temperature gradient is varied by varying a resistance of a variable resistor circuit comprising two or more resistors which have different temperature gradients.

17. The method of claim 16, wherein the output current is adjusted to compensate for variations in the second current based on variations of the temperature gradient of the second current.

* * * * *